(12) United States Patent
Donald et al.

(10) Patent No.: US 10,871,424 B2
(45) Date of Patent: Dec. 22, 2020

(54) APPARATUS, SYSTEMS AND METHODS FOR SAMPLING FLUIDS

(71) Applicant: Enpro Subsea Limited, Aberdeen (GB)

(72) Inventors: Ian Donald, Aberdeenshire (GB); John Reid, Tayside (GB)

(73) Assignee: Enpro Subsea Limited, Aberdeen (GB)

( * ) Notice: Subject to any disclaimer, the term of this patent is extended or adjusted under 35 U.S.C. 154(b) by 181 days.

(21) Appl. No.: 16/093,020

(22) PCT Filed: Apr. 13, 2017

(86) PCT No.: PCT/GB2017/051046
§ 371 (c)(1),
(2) Date: Oct. 11, 2018

(87) PCT Pub. No.: WO2017/178830
PCT Pub. Date: Oct. 19, 2017

(65) Prior Publication Data
US 2019/0162635 A1    May 30, 2019

(30) Foreign Application Priority Data

Apr. 13, 2016 (GB) .................................. 1606502.1

(51) Int. Cl.
*G01N 1/00* (2006.01)
*G01N 1/20* (2006.01)
(Continued)

(52) U.S. Cl.
CPC ............ *G01N 1/2035* (2013.01); *F16L 55/26* (2013.01); *F16L 2101/30* (2013.01); *G01N 2001/205* (2013.01); *G01N 2001/2064* (2013.01)

(58) Field of Classification Search
CPC .. G01N 1/00–20; G01N 1/2035; G01N 1/205; G01N 1/2064; E21B 49/08;
(Continued)

(56) References Cited

U.S. PATENT DOCUMENTS

| | | | | |
|---|---|---|---|---|
| 2002/0041832 A1* | 4/2002 | Duriez | ................. | G01N 1/2035 436/29 |
| 2010/0059221 A1* | 3/2010 | Vannuffelen | .......... | E21B 49/081 166/264 |

(Continued)

FOREIGN PATENT DOCUMENTS

EP    2447588 A2    5/2012

OTHER PUBLICATIONS

International Search Opinion and Written Opinion dated Jul. 26, 2017 for International App. No. PCT/GB2017/051046.

*Primary Examiner* — Nguyen Q. Ha
(74) *Attorney, Agent, or Firm* — Perkins Coie LLP

(57) ABSTRACT

The invention provides a sampling apparatus for sampling fluid from a pipeline system during a pigging operation and a method of use. The sampling apparatus comprises an inlet configured to be coupled to the pipeline system, for receiving a fluid carried by a pigging operation from the pipeline system, and an outlet for discharging fluid from the sampling apparatus. A flow control valve is disposed between the inlet and the outlet. A first flow line is in communication with a sampling circuit and is disposed between the inlet and the flow control valve. A second flow line is in communication with a sampling circuit, and is disposed between the outlet and the flow control valve. The flow control valve is operable to be partially closed to create a pressure differential between the first and second flow lines, and drive a fluid passing through the sampling apparatus into the sampling circuit.

19 Claims, 2 Drawing Sheets

(51) Int. Cl.
*E21B 49/08* (2006.01)
*F16L 55/26* (2006.01)
*F16L 101/30* (2006.01)

(58) Field of Classification Search
CPC ... F16L 1/26; F16L 55/00; F16L 55/26; F16L 2101/30
See application file for complete search history.

(56) References Cited

U.S. PATENT DOCUMENTS

| | | | |
|---|---|---|---|
| 2010/0147391 A1* | 6/2010 | Stoy | G05D 7/0635 137/2 |
| 2012/0107051 A1* | 5/2012 | Sweeney | B08B 9/055 405/184.1 |

* cited by examiner

APPARATUS, SYSTEMS AND METHODS FOR SAMPLING FLUIDS

The present invention relates to apparatus, systems and methods for sampling fluids, in particular to apparatus, systems and methods for sampling fluids in pipeline operations. The invention has particular application to sampling fluids in pipeline pigging operations, and aspects of the invention relate specifically to fluid sampling apparatus, systems and methods.

BACKGROUND TO THE INVENTION

In the field of oil and gas exploration and production, it is common to perform maintenance operations upon pipelines to ensure their integrity. Such activities may be performed pre-commissioning of the pipeline, throughout the pipelines active life span and as preparative steps for decommissioning. In particular, pipelines are often required to undergo specific series of processes before being commissioned and during decommissioning.

Pipeline maintenance activities are performed to ensure that pipelines can safely and effectively transport fluid as required in normal operation, and/or so that they can be safely and effectively decommissioned. Such activities may include cleaning, gauging, testing, inspection and dewatering. It is common to carry out many of these activities using pipeline pigs. A pipeline pig is a device which is introduced to a pipeline though a pig launcher and driven through its interior, typically under the pressure of the pipeline fluid or a gas. A pipeline pig is removed from a pipeline via a pig receiver. Pigs are designed to perform various different functions as they travel through the interior of a pipeline.

Pipeline pigs may be used to push a volume, or volumes, of fluid through the interior of a pipeline. Fluid volumes, commonly known as "slugs" of fluid are placed either in front of an individual pig or in the spaces between a string of multiple pigs. The fluid slugs are pushed through the pipeline as the pigs are propelled towards the pig receiver. The pigging fluid is typically removed from the pipeline via the pig receiver which will divert the fluid for disposal, collection, storage, processing, analysis or otherwise. Alternatively, the fluid may be routed into another pipeline. The fluid which is used in pipeline pigging operations will generally be chosen to provide some sort of treatment to the interior of the pipeline.

One common application for pigging is pipeline dewatering. Pipeline dewatering is a process in which residual water is removed from a pipeline and is often undertaken after the completion of pipeline hydrotesting, an important step in the pre-commissioning process of a pipeline. Residual water is removed from a pipeline often because it has the potential to react with, or reduce the purity of, the intended pipeline fluid. Residual water may also lead to the formation of hydrates. Pigs can be used for pipeline dewatering in various ways. For the physical removal of water, displacement pigs can be used to simply push the water out of the pipeline. In pipelines where there is the potential for hydrate formation, pigs will be used in conjunction with a conditioning chemical to provide treatment to the pipeline in addition to dewatering.

A chemical which is often used to dewater pipelines in which hydrate formation is a risk is monoethylene glycol (MEG), an antifreeze product which inhibits hydrate formation. In this application, slugs of MEG are inserted either in front of an individual pig or in the spaces between a string of multiple pigs. As pigs push the MEG through the pipeline it will act to absorb the residual water. As well as removing water, this process may also deposit a thin film of MEG over the inner wall of the pipeline, inhibiting the formation of hydrates in the future.

Upon completion of pipeline dewatering, excess MEG will remain. The excess MEG will be either routed into another pipeline, or directed elsewhere for storage, collection, analysis and/or disposal. By analysing the water content of the excess MEG which has been returned from a dewatering process it possible to gauge an estimate of how much water has been removed from the pipeline. Various other properties of the residual MEG may also be analysed.

Another common application for pigging is the removal of residual oil from pipelines. By analysing the fluid from such operation it is possible to estimate whether hydrocarbons remain in a pipeline, thus determining whether the cleaning operation has been successful.

SUMMARY OF THE INVENTION

There is generally a need for a method and/or apparatus for sampling fluids in pipeline operations which addresses one or more drawbacks of known methods and/or apparatus.

It is amongst the aims and objects of the invention to provide a method and/or apparatus for collecting a sample of a pigging fluid which addresses one or more drawbacks of known methods and/or apparatus.

Other aims and objects of the invention include providing an improved sampling circuit, sampling tools and/or method of sampling.

A further aim of at least one aspect or embodiment of the invention is to provide a sampling apparatus and methods of use which facilitates the gathering of fluid samples over an extended period of time.

A further aim of at least one aspect of the invention is to provide a sampling apparatus and method of use which is able to produce a proportionally small sample of fluid which is representative of the bulk fluid volume, over an extended period of time.

Further aims and aspects of the invention will become apparent from the following description.

According to a first aspect of the invention, there is provided a sampling apparatus for sampling fluid from a flow system, the sampling apparatus comprising:
an inlet configured to be coupled to the flow system, for receiving fluid flowing from the flow system;
an outlet for discharging fluid from the apparatus;
a flow control valve disposed between the inlet and the outlet;
a first flow line in communication with a sampling circuit, the first flow line disposed between the inlet and the flow control valve;
a second flow line in communication with a sampling circuit, the second flow line disposed between the outlet and the flow control valve;
wherein the flow control valve is operable to be partially closed to create a pressure differential between the first and second flow lines, and thereby drive a fluid passing through the apparatus into the sampling circuit.

The flow control valve may be operable to drive a portion of a fluid passing through the apparatus to the sampling circuit. The flow control valve can be a conventional flow control valve of the type commonly used in subsea applications, which are readily available, have known reliability, and which are easily adjusted with conventional subsea tools.

The inventors have appreciated that only a small pressure differential is desirable in order to drive a fluid through the sampling circuit without creating excessive flow of the fluid into the sampling bottles. By use of a flow control valve, the pressure differential can be adjusted by using an ROV (or in shallow water, a diver) to control the extent to which the valve is used to create a flow restriction. This simple adjustability means that the valve position can be modified to maintain the desired pressure differential in a range of different flow conditions.

The control provided by the valve adjustment enables the pressure differential to be optimised to the flow system, to enable fluid sampling over an extended period. In particular, the valve position can be adjusted in dependence on at least one flow parameter, for example the flow rate, to ensure that the fluid can be sampled over a majority of, or the entirety of, a flow operation of the flow system.

The flow control valve may be a first flow control valve, and the sampling apparatus may comprise a second flow control valve. The second flow control valve may be disposed in the sampling circuit, and/or the first and/or second flow lines to the sampling circuit. Preferably, the second flow control valve is operable to regulate the flow of fluid through the sampling circuit, which may therefore regulate the flow of fluid into the sampling circuit. The second flow control valve may be operable to choke the flow in the sampling circuit. Preferably, the second flow control valve is operable to be partially closed to regulate the flow of fluid through the sampling circuit. In one embodiment, the second flow control valve is disposed in an inlet flow line to the sampling circuit. Alternatively, or in addition, the second flow control valve is disposed in an outlet flow line from the sampling circuit.

The first flow control valve may be operable to create a pressure differential sufficient to create a turbulent and/or mixed flow of fluid in the sampling circuit. The first flow control valve may be operable to create a pressure differential in excess of that required or desired to drive a sufficient portion of fluid passing through the sampling apparatus into the sampling circuit, in order to create a turbulent and/or mixed flow of fluid in the sampling circuit.

The second flow control valve may be operable change the turbulent and/or mixed flow of fluid into a laminar, or substantially laminar, flow of fluid through and/or into the sampling circuit.

The sampling apparatus may also comprise a further flow control valve which may be operable to be partially closed to regulate the flow of fluid through the sampling circuit and/or which is operable to change a turbulent and/or mixed flow of fluid into a laminar, or substantially laminar, flow of fluid through and/or into the sampling circuit.

The further flow control valve may be disposed in an inlet and/or an outlet flow line from the sampling circuit.

According to a second aspect of the invention, there is provided a sampling apparatus for sampling fluid from a pipeline system during a pigging operation, the sampling apparatus comprising:
an inlet configured to be coupled to the pipeline system, for receiving a fluid carried by a pigging operation from the pipeline system;
an outlet for discharging fluid from the sampling apparatus;
a flow control valve disposed between the inlet and the outlet;
a first flow line in communication with a sampling circuit, the first flow line disposed between the inlet and the flow control valve;
a second flow line in communication with a sampling circuit, the second flow line disposed between the outlet and the flow control valve;
wherein the flow control valve is operable to be partially closed to create a pressure differential between the first and second flow lines, and thereby drive a fluid passing through the sampling apparatus into the sampling circuit.

The pipeline system may comprise a pig receiver, and the apparatus may be configured to receive a fluid carried by a pigging operation from the pig receiver. The pipeline system may comprise a pig launcher.

The flow control valve may be operable to drive a portion of a fluid passing through the apparatus to the sampling circuit during the pigging operation. The flow control valve can be a conventional flow control valve of the type commonly used in subsea applications, which are readily available, have known reliability, and which are easily adjusted with conventional subsea tools.

The inventors have appreciated that only a small pressure differential is desirable in order to drive a fluid through the sampling circuit without creating excessive flow of the fluid into the sampling bottles. By use of a flow control valve, the pressure differential can be adjusted by using an ROV (or in shallow water, a diver) to control the extent to which the valve is used to create a flow restriction. This simple adjustability means that the valve position can be modified to maintain the desired pressure differential in a range of different flow conditions.

The control provided by the valve adjustment enables the pressure differential to be optimised to the pigging operation, to enable fluid sampling over an extended period of the pigging operation. In particular, the valve position can be adjusted in dependence on at least one flow parameter, for example the flow rate, to ensure that the fluid can be sampled over a majority of, or the entirety of, the pigging operation.

The flow control valve may be a first flow control valve, and the sampling apparatus may comprise a second flow control valve. The second flow control valve may be disposed in the sampling circuit, and/or the first and/or second flow lines to the sampling circuit. Preferably, the second flow control valve is operable to regulate the flow of fluid through the sampling circuit, which may therefore regulate the flow of fluid into the sampling circuit. The second flow control valve may be operable to choke the flow in the sampling circuit. Preferably, the second flow control valve is operable to be partially closed to regulate the flow of fluid through the sampling circuit. The sampling apparatus may also comprise a further flow control valve which is operable to be partially closed to regulate the flow of fluid through the sampling circuit. In one embodiment, the second flow control valve is disposed in an inlet flow line to the sampling circuit. Alternatively, or in addition, the second flow control valve and/or a further flow control valve is disposed in an outlet flow line from the sampling circuit.

The first flow control valve may be operable to create a pressure differential sufficient to create a turbulent and/or mixed flow of fluid in the sampling circuit. The first flow control valve may be operable to create a pressure differential in excess of that required or desired to drive a sufficient portion of fluid passing through the sampling apparatus into the sampling circuit, in order to create a turbulent and/or mixed flow of fluid in the sampling circuit.

The second flow control valve may be operable change the turbulent and/or mixed flow of fluid into a laminar, or substantially laminar, flow of fluid through and/or into the sampling circuit.

The further flow control valve may be operable to change a turbulent and/or mixed flow of fluid into a laminar, or substantially laminar, flow of fluid through and/or into the sampling circuit.

The further flow control valve may be disposed in an inlet and/or an outlet flow line from the sampling circuit.

The pigging operation may be any pigging operation in which fluid is present and in which consequent sampling of said fluid is desirable. This may include dewatering, chemical swabbing, cleaning and/or the removal of residual oil. Preferably the pigging operation is a dewatering application. The fluid may be a swabbing chemical, and may comprise monoethylene glycol (MEG).

Embodiments of the second aspect of the invention may include one or more features of the first aspect of the invention or its embodiments, or vice versa.

According to a third aspect of the invention, there is provided a method of sampling fluid from a pipeline system during a pigging operation, the method comprising:
providing a sampling apparatus comprising:
   an inlet configured to be coupled to the pipeline system and an outlet for discharging fluid from the sampling apparatus;
   a flow control valve disposed between the inlet and the outlet; and
   a sampling circuit;
driving a pipeline pig through the pipeline system to carry a fluid through the pipeline system and into the sampling apparatus; and
partially closing the flow control valve to create a pressure differential to thereby drive the fluid passing through the sampling apparatus into the sampling circuit.

The method may comprise collecting fluid in one or sampling bottles or vessels. Preferably, the method comprises sampling fluid over a majority of, or the entirety of, the pigging operation.

The method may comprise partially closing the flow control valve to create a pressure differential sufficient to create a turbulent and/or mixed flow of fluid in the sampling circuit.

The flow control valve may be a first flow control valve, and the sampling apparatus may comprise a second flow control valve. Where a second flow control valve is provided, the method may comprise regulating the flow of fluid through and/or into the sampling circuit. The method may comprise choking the flow through sampling circuit.

Thus the method may comprise partially closing the flow control valve to create a pressure differential in excess of that required or desired to drive a sufficient portion of fluid passing through the sampling apparatus into the sampling circuit, in order to create a turbulent and/or mixed flow of fluid in the sampling circuit. The second flow valve regulates the turbulent and/or mixed flow of fluid back to the required flow rate for sampling of the fluid over the desired sampling period (for example over a majority of, or the entirety of, the pigging operation).

The sampling apparatus may comprise a further flow control valve. Where a further flow control valve is provided, the method may comprise regulating the flow of fluid through the sampling circuit using the second flow control valve and/or the further flow control valve.

The method may comprise partially closing the second flow valve and/or the further flow control valve to regulate a turbulent and/or mixed flow of fluid back to the required flow rate for sampling of the fluid.

The second and/or further flow control valves may be operable change a turbulent and/or mixed flow of fluid into a laminar, or substantially laminar, flow of fluid through and/or into the sampling circuit and the method may comprise partially closing the second flow valve and/or the further flow control valve to change a turbulent and/or mixed flow of fluid into a laminar, or substantially laminar, flow of fluid for sampling of the fluid.

Embodiments of the third aspect of the invention may include one or more features of the first or second aspects of the invention or their embodiments, or vice versa.

According to a fourth aspect of the invention, there is provided a system comprising a pipeline and a sampling apparatus according to the first or second aspects of the invention.

The system preferably comprises a pig receiver. The sampling apparatus may be configured to receive a fluid carried by a pigging operation from the pig receiver. Preferably, the system comprises a pig launcher.

Embodiments of the fourth aspect of the invention may include one or more features of the first to third aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
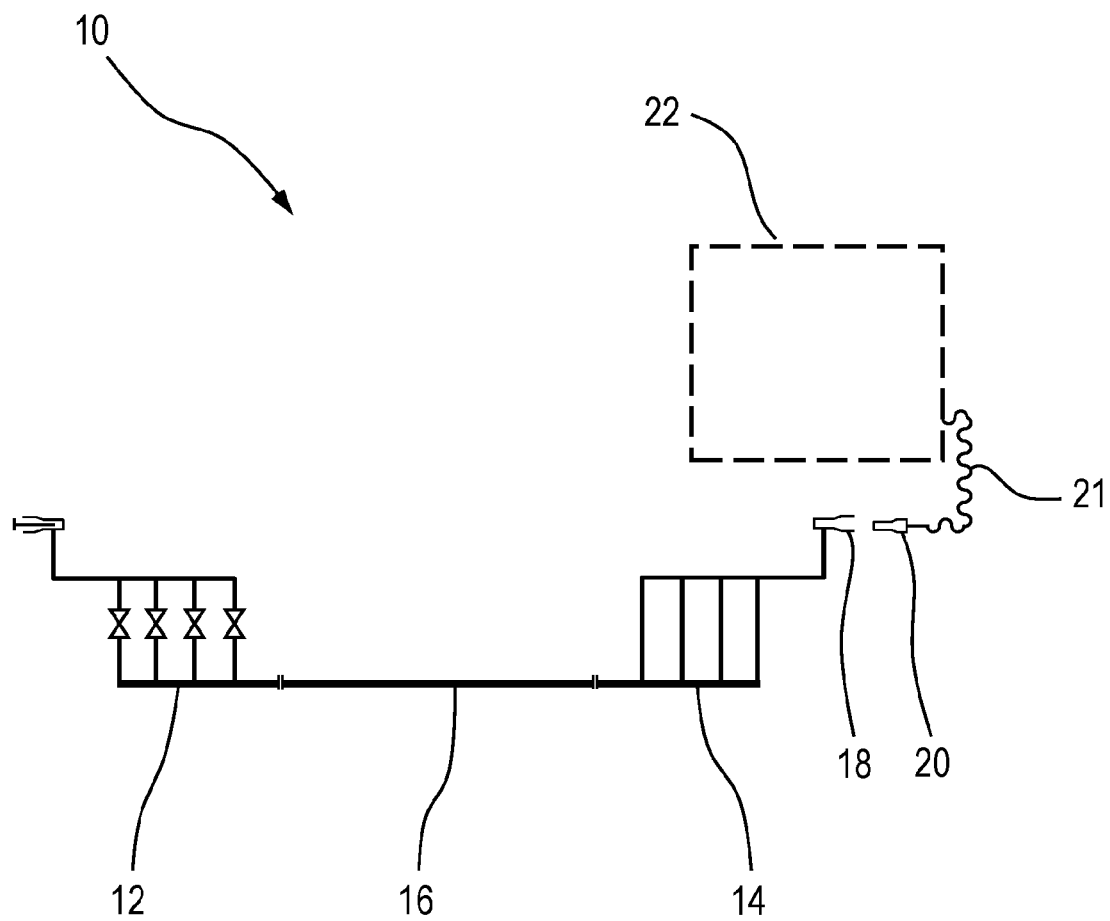
FIG. 1 is a schematic representation of a subsea pipeline system coupled to a sampling module according to an embodiment of the invention.

Referring firstly to FIG. 1, there is shown generally at 10 a subsea pipeline system comprising a subsea pipeline 16, coupled to a fluid sampling module 22. The subsea pipeline 16 has a pig launcher 12 at its first end and a pig receiver 14 at its second end to facilitate a pigging operation through said pipeline 16.

The pig launcher 12 enables a pig, or a string of pigs joined together (commonly known as a pig train) to be inserted into the pipeline 16 and propelled towards the pig receiver 14. Fluid used in the pigging process will also be carried towards the pig receiver 14 ahead of the pipeline pig.

In an example application of the invention, the pigging operation performed is the dewatering of the pipeline 16 by a chemical treatment process known as chemical swabbing. A chemical which is commonly used in the dewatering and drying of pipelines is monoethylene glycol (MEG). In this application, the pig or pig train is launched into the pipeline 16 via the pig launcher 12. The pig launcher 12 is coupled to a source (not shown) which facilitates the introduction of MEG into the pipeline. The MEG is deployed in conjunction with the pig or pig train in such a way that at least one slug of MEG is moved through the pipeline by the pig or pig train. It will be appreciated that there may be a slug of MEG between respective pigs in a pig train, resulting in multiple slugs of MEG. The pig or pig train is propelled through the pipeline by a fluid. As the pig or pig train moves through the pipeline the chemical swabbing process is carried out by the MEG. MEG travels towards the pig receiver during the pigging operation, carried by the pig or pig train. Upon completion of a pigging operation, when the pig or pig train reaches the end of the pipeline section, it enters the pig receiver 14. Any excess MEG which remains with the pig or pig train at this point is also transported to the pig receiver 14 as the pig or pig train enters the receiver 14.

Typically, the MEG will be discharged from the pig receiver and either routed into another pipeline, or directed elsewhere for storage, collection, or disposal. However, it is desirable in some applications to sample the MEG for analysis, and the system 10 is designed to flow the MEG through the fluid sampling module 22. From here, the collected samples of MEG may be analysed. Such an analysis may focus on the properties of the MEG, and may consequently provide an insight as to how successful the dewatering process has been. The fluid sampling module 22 is coupled to the pig receiver 14 via the conduit 21 which extends from the sampling module 22. In this embodiment, the sampling module is coupled to the pig receiver by a male stab connector 20 at the end of the conduit 21. The male stab connector 20, which is inserted into a female receptacle 18 of the pig receiver 14, allows fluid to flow from the pig receiver 14 to the sampling module 22.

During pigging, as MEG reaches the receiver 14, it is transported to the sampling module 22 via the conduit 21. This allows for continuous discharge of MEG from the receiver 14 through the sampling module 22.

Figure 2:
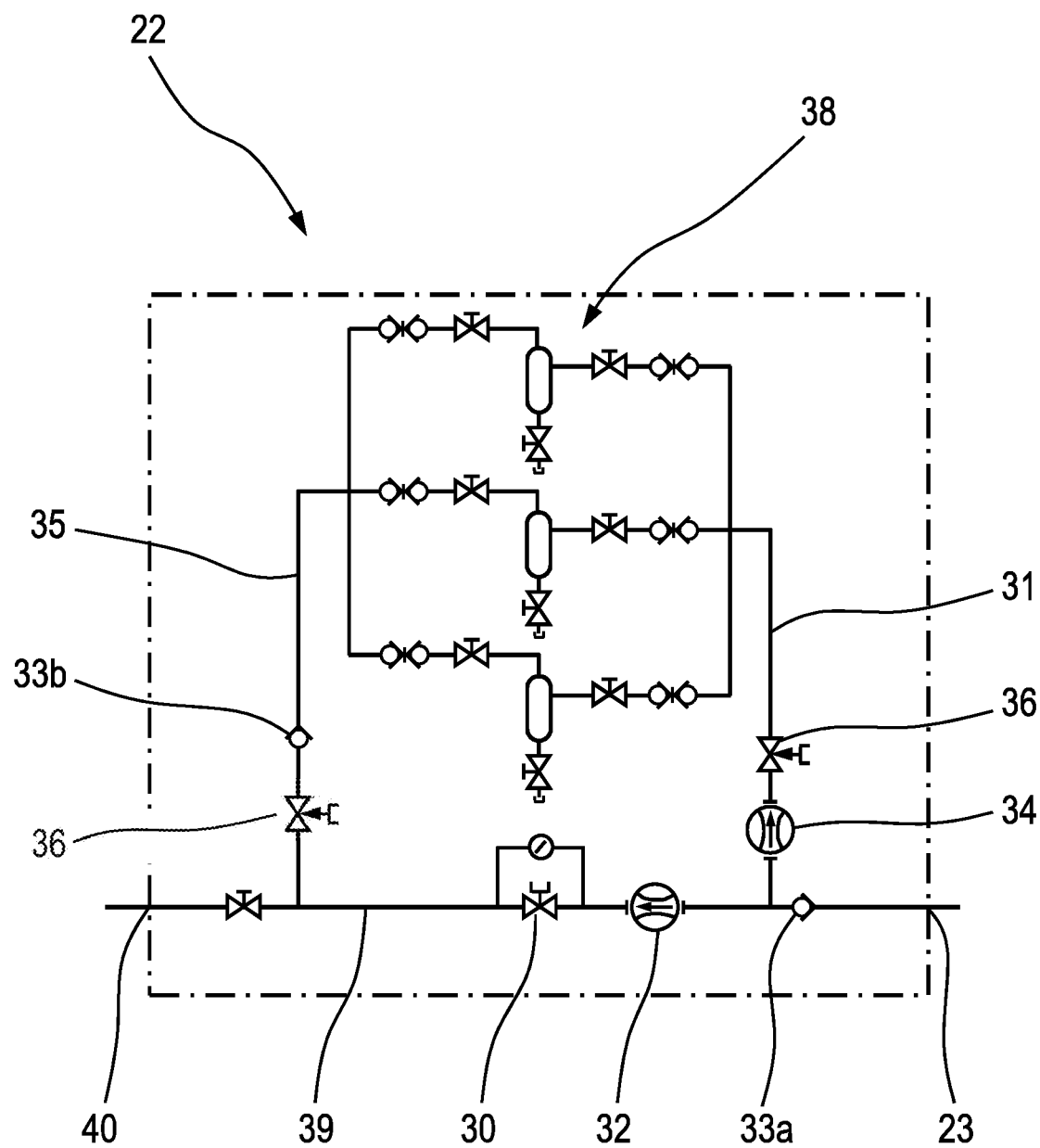
FIG. 2 is a process and instrument diagram showing schematically the sampling module of FIG. 1.

FIG. 2 shows the sampling module 22 of FIG. 1 in more detail. The module comprises an inlet 23 and an outlet 40. The module 22 also comprises a sampling circuit, generally shown at 38. The sampling circuit 38 is disposed between the module inlet 23 and outlet 40, and comprises a first flowline 31 and a second flowline 35, which respectively provide an inlet and an outlet to the sampling circuit. In this case, the sampling circuit contains three sampling bottles. In addition, the sampling circuit comprises an arrangement of various valves which facilitate and control the flow of fluid through the sampling circuit, providing the ability to selectively isolate sections of the circuit, such as a sampling bottle. In this embodiment, the valves are gate valves, although it will be appreciated that other valve types can be used.

A bypass line flowline 39 connects the first and second flowlines 31, 35 and is provided with a first flowmeter 32. A first controllable flow control valve 30 is disposed on the bypass flowline 39 between the first and second flowlines 31, 35. The first flow control valve 30 enables fluid entering the sampling module 22 to be driven into the sampling circuit 38 in use. A second flow control valve 36, which in this case is a needle valve, is disposed on first flowline 31 and is open in normal operation. The first flow meter 32 measures the flow of the fluid passing through the system. A second flowmeter 34 is disposed on the first flowline 31 and measures the flow of the fluid passing through the sampling circuit 38. Check valves 33a and 33b are provided on flowlines 39 and 35, respectively, to prevent return flow.

In use, fluid carried by the pigging operation enters the sampling module via inlet 23. In a sampling mode, the flow control valve 30 is operated to initiate sampling. Flow control valve 30 is partially closed such that the valve member partially impinges on the flow. This flow disruption creates a hydrodynamic pressure differential between the first and second flowlines 31, 35 which is sufficient to drive the fluid through the sampling circuit and into one or more of the sampling bottles, shown generally at 38.

Excess flow, which is not routed into the sampling circuit 38, passes through flow control valve 30 and exits the sampling module 22 via sampling module outlet 40.

By use of a flow control valve 30, the pressure differential can be adjusted by using an ROV (or in shallow water, a diver) to control the extent to which the valve is used to create a flow restriction. This simple adjustability means that the valve position can be modified to create a small pressure differential, for example of the order of 0.1 bar (0.1 MPa), required to drive the desired proportion of fluid into the sampling circuit, such that the capacity of the sampling bottles or vessels is utilised over the desired sampling duration. In the context of pigging operations, the sampling module has the ability to sample a small proportion of the bulk fluid volume of a slug of pigging fluid over an extended period of time; preferably the majority of, or the entirety of the pigging operation.

The adjustability of the valve also enables an operator or contractor to maintain the desired pressure differential in a range of different flow conditions, and optimised to the flow.

The flow control valve can be a conventional flow control valve of the type commonly used in subsea applications, which are readily available, have known reliability, and which are easily adjusted with conventional subsea tools.

The inclusion of the needle valve 36 facilitates the mixing of multiphase fluid flow prior to its entry into the sampling circuit 38. In a sampling mode, flow control valve 30 creates a flow restriction which produces a pressure differential between the first and second flowlines 31, 35. Although only a small pressure differential, of the order of 1 bar (0.1 MPa), may be required to drive the desired proportion of fluid through the sampling circuit, in certain applications the fluid entering the sampling circuit may be unrepresentative of the fluid. This may apply in particular to multiphase flow applications. When a multiphase fluid contains fluids of various densities, flow regimes may develop which may not provide a representative sample of the fluid. Instead, the fluid must be mixed before entering the sampling circuit 38.

In some modes of operation, the flow control valve 30 may be partially closed to create an increased pressure differential, greater than that required or desired to drive a sufficient portion of fluid into the sampling circuit. This pressure differential produces a turbulent and/or mixed flow on the inlet side of sampling circuit 38.

The flow must then pass through needle valve 36. Valve 36 is adjusted to provide a restriction, which regulates the fluid flow passing into the sampling circuit 38, and returns the flow to a desired sampling flowrate. Therefore, valves 30 and 36 work in unison to mix the fluid before it enters the main portion of the sampling circuit 38, by inducing turbulent and/or mixed flow into the sampling circuit, and then regulating the resulting flow to a desired rate. The combination of valves 30 and 36 mitigates the unrepresentative sampling which would occur if an unmixed and unrepresentative flow regime were to enter the sampling bottles, but maintains the ability of the module to sample a small proportion of the bulk fluid volume of a slug of pigging fluid over an extended period of time; preferably the majority of, or the entirety of, the pigging operation.

In the embodiment shown in FIG. 2, the second flow control valve 36 is disposed on the first flowline 31, which forms the inlet to the sampling circuit 38. However, it will be appreciated that in alternative embodiments, the second flow control valve may be disposed elsewhere, such as on the second flowline 35 which forms the outlet to the sampling circuit or at another position on the sampling circuit. The second flow valve may still function to regulate the flow rate of the sampled fluid through the sampling circuit to a desired rate, so that the first flow control valve 30 can be operated to a create a mixed and/or turbulent flow. It will also be appreciated that the flow regulation function of the second flow control valve may be performed by two or more valves disposed in the sampling circuit, for example, by flow control valves disposed on both the first and second flowlines 31, 35 respectively working independently or in conjunction with one another.

In the context of a pipeline dewatering process using MEG, the MEG may be mixed by the turbulent flow created by the valve 30 to facilitate entry of a representative flow volume into the sampling circuit. The valve 36 regulates the proportion of flow passing into the sampling circuit, so that the capacity of the sampling bottles can be utilised over the majority or entirety of the pigging operation. This will result in a MEG sample which is an improved representation of the entire pigging process. Properties of the MEG collected in the sampling bottles can be consequently analysed to provide an insight into the extent of pipeline dewatering which has been achieved.

The invention has particular application to the sampling of MEG in a pipeline dewatering application, and the principles of the invention have been described in this context by way of example only. It will be appreciated that the invention has application to the sampling of other fluids over extended sampling periods, and the potential to be coupled to a range of different surface, subterranean or subsea pipelines or other fluid conduit systems. The invention also has particular application to the sampling of fluid from a cleaning or flushing application, to ensure sufficient removal of residual oil from a pipeline as part of a decommissioning process.

The invention provides a sampling apparatus for sampling fluid from a pipeline system during a pigging operation and a method of use. The sampling apparatus comprises an inlet configured to be coupled to the pipeline system, for receiving a fluid carried by a pigging operation from the pipeline system, and an outlet for discharging fluid from the sampling apparatus. A flow control valve is disposed between the inlet and the outlet. A first flow line is in communication with a sampling circuit and is disposed between the inlet and the flow control valve. A second flow line is in communication with a sampling circuit, and is disposed between the outlet and the flow control valve. The flow control valve is operable to be partially closed to create a pressure differential between the first and second flow lines, and drive a fluid passing through the sampling apparatus into the sampling circuit.

Embodiments of the invention provide a flow sampling solution which facilitates a variety of applications. These include fluid sampling during pigging applications such as cleaning, chemical swabbing and dewatering. These also include applications in which the flow requires mixing prior to sampling such as when the flow is multiphase and applications which require sampling to be undertaken over an extended period of time. Other applications are also within the scope of the invention.

Various modifications to the above-described embodiments may be made within the scope of the invention, and the invention extends to combinations of features other than those expressly claimed herein.

The invention claimed is:

1. A sampling apparatus for sampling fluid from a pipeline system during a pigging operation, the pigging operation being dewatering the sampling apparatus comprising:
    an inlet configured to be coupled to the pipeline system, for receiving a fluid carried by a pigging operation from the pipeline system;
    an outlet for discharging fluid from the sampling apparatus;
    a flow control valve disposed between the inlet and the outlet;
    a first flow line in communication with a sampling circuit, the first flow line disposed between the inlet and the flow control valve;
    a second flow line in communication with the sampling circuit, the second flow line disposed between the outlet and the flow control valve;
    wherein the flow control valve is operable to be partially closed to create a pressure differential between the first and second flow lines, and thereby drive a fluid passing through the sampling apparatus into the sampling circuit.

2. The sampling apparatus according to claim 1, wherein the flow control valve is operable to drive a portion of a fluid passing through the apparatus to the sampling circuit during the pigging operation.

3. The sampling apparatus according to claim 1, wherein the flow control valve is operable to be adjusted in dependence on at least one flow parameter to sample fluid over at least a majority of the pigging operation.

4. The sampling apparatus according to claim 1, wherein the flow control valve is operable to be adjusted in dependence on at least one flow parameter to sample fluid over the entirety of the pigging operation.

5. The sampling apparatus according to claim 1, wherein the flow control valve is a first flow control valve, and the sampling apparatus further comprises a second flow control valve.

6. The sampling apparatus according to claim 5, wherein the second flow control valve is disposed in an inlet flow line to the sampling circuit.

7. The sampling apparatus according to claim 5, wherein the second flow control valve is disposed in an outlet flow line from the sampling circuit.

8. The sampling apparatus according to claim 1, wherein the fluid is a swabbing chemical.

9. The sampling apparatus according to claim 1, wherein the fluid comprises monoethylene glycol (MEG).

10. A method of sampling fluid from a pipeline system during a pigging operation, the method comprising:
    providing a sampling apparatus comprising:
        an inlet configured to be coupled to the pipeline system and an outlet for discharging fluid from the sampling apparatus;
        a flow control valve disposed between the inlet and the outlet; and
        a sampling circuit;
    driving a pipeline pig through the pipeline system to carry a fluid through the pipeline system and into the sampling apparatus; and
    partially closing the flow control valve to create a pressure differential to thereby drive the fluid passing through the sampling apparatus into the sampling circuit.

11. The method according to claim 10, wherein the method comprises collecting fluid in one or sampling bottles or vessels.

12. The method according to claim 10, wherein the method comprises sampling fluid over at least a majority of the pigging operation.

13. The method according to claim 10, wherein the method comprises sampling fluid over the entirety of the pigging operation.

14. The method according to claim 10, wherein the method comprises partially closing the flow control valve to create a pressure differential sufficient to create a turbulent and/or mixed flow of fluid in the sampling circuit.

15. The method according to claim 10, wherein the flow control valve is a first flow control valve, and the sampling apparatus further comprises a second flow control valve.

16. The method according to claim 15, wherein the method comprises regulating the flow of fluid into or through the sampling circuit using the second flow control valve.

17. The method according to claim 15, wherein the sampling apparatus comprises a further flow control valve and wherein the method comprises partially closing the second flow valve and the further flow control valve to regulate a turbulent and/or mixed flow of fluid back to the required flow rate for sampling of the fluid.

18. A subsea system comprising:
- a pipeline system;
- a pig receiver fluidly connected to the pipeline system, and
- a sampling apparatus for sampling fluid from a pipeline system during a pigging operation, the sampling apparatus comprising:
  - an inlet configured to be coupled to the pipeline system, for receiving a fluid carried by a pigging operation from the pipeline system;
  - an outlet for discharging fluid from the sampling apparatus;
  - a flow control valve disposed between the inlet and the outlet;
  - a first flow line in communication with a sampling circuit, the first flow line disposed between the inlet and the flow control valve;
  - a second flow line in communication with a sampling circuit, the second flow line disposed between the outlet and the flow control valve;
  - wherein the flow control valve is operable to be partially closed to create a pressure differential between the first and second flow lines, and thereby drive a fluid passing through the sampling apparatus into the sampling circuit.

19. The system according to claim 18, wherein the system comprises a pig launcher.

\* \* \* \* \*